US010400821B2

(12) United States Patent
Na et al.

(10) Patent No.: US 10,400,821 B2
(45) Date of Patent: Sep. 3, 2019

(54) VERTICAL BEARING DEVICE

(71) Applicant: DAIDO METAL COMPANY LTD., Nagoya-shi, Aichi (JP)

(72) Inventors: Kwangik Na, Inuyama (JP); Shigeyoshi Mori, Inuyama (JP); Tadatoshi Nagasaki, Inuyama (JP)

(73) Assignee: DAIDO METAL COMPANY LTD., Nagoya-shi, Aichi (JP)

( * ) Notice: Subject to any disclaimer, the term of this patent is extended or adjusted under 35 U.S.C. 154(b) by 0 days.

(21) Appl. No.: 15/753,325

(22) PCT Filed: May 24, 2016

(86) PCT No.: PCT/JP2016/065303
§ 371 (c)(1),
(2) Date: Feb. 18, 2018

(87) PCT Pub. No.: WO2017/029852
PCT Pub. Date: Feb. 23, 2017

(65) Prior Publication Data
US 2018/0238389 A1      Aug. 23, 2018

(30) Foreign Application Priority Data
Aug. 19, 2015  (JP) ................................. 2015-162027

(51) Int. Cl.
*F16C 33/10*  (2006.01)
*F16N 7/20*  (2006.01)
(Continued)

(52) U.S. Cl.
CPC .......... *F16C 33/107* (2013.01); *F04D 29/582* (2013.01); *F16C 33/10* (2013.01);
(Continued)

(58) Field of Classification Search
CPC ...... F16C 17/10; F16C 33/103; F16C 33/105; F16C 33/107; F16C 33/10; F16C 2360/00;
(Continued)

(56) References Cited

U.S. PATENT DOCUMENTS 1,739,362 A * 12/1929 Kingsbury .............. F16C 17/06
                                                                  384/303
1,942,101 A *  1/1934 Howarth ............. F16H 57/0421
                                                                  184/104.1
(Continued)

FOREIGN PATENT DOCUMENTS

DE         3501731 A *  7/1986  .............. F16C 33/10
EP           83904 A1 *  7/1983  .............. F16C 33/10
(Continued)

OTHER PUBLICATIONS

International Search Report dated Aug. 2, 2016, for International Patent Application No. PCT/JP2016/065303.
(Continued)

*Primary Examiner* — Marcus Charles
(74) *Attorney, Agent, or Firm* — Karceski IP Law, PLLC

(57) ABSTRACT

When an annular portion of a thrust collar rotates together with a rotating shaft member, centrifugal force and shear force, or differential pressure caused by difference in flow rate are generated in lubricating oil in a circulation oil chamber. With this, the lubricating oil in the circulation oil chamber is guided from the inner peripheral side to the outer peripheral side of the annular portion, through a circulation hole penetrating the annular portion. The flow of lubricating oil guided by the circulation hole forms a flow of lubricating oil from a lower oil chamber to an upper oil chamber through the circulation oil chamber. As a result, the lubricating oil stored in the lower oil chamber is circulated to the (Continued)

upper oil chamber through the circulation oil chamber, by rotation of the thrust collar.

22 Claims, 10 Drawing Sheets

(51) Int. Cl.
| | | |
|---|---|---|
| *H02K 5/167* | (2006.01) | |
| *F04D 29/58* | (2006.01) | |
| *F16N 39/02* | (2006.01) | |
| *F16N 7/14* | (2006.01) | |
| *F16C 17/10* | (2006.01) | |

(52) U.S. Cl.
CPC .............. *F16N 7/20* (2013.01); *F16N 39/02* (2013.01); *H02K 5/167* (2013.01); *F16C 17/10* (2013.01); *F16N 7/14* (2013.01); *H02K 2205/03* (2013.01)

(58) Field of Classification Search
CPC .... F16C 33/1045; F16C 33/6662; F16N 7/14; F16N 7/20; F16N 9/04; F16N 39/02; H02K 5/1672; H02K 5/167; H02K 2205/03; F04D 29/582
USPC ....... 384/107, 114, 160, 193, 316, 322, 462, 384/473; 184/14, 104.1, 104.3; 310/90, 310/157; 415/11
See application file for complete search history.

(56) References Cited

U.S. PATENT DOCUMENTS

| | | | | | |
|---|---|---|---|---|---|
| 1,971,412 | A | * | 8/1934 | Howarth | F16C 17/06 384/306 |
| 2,154,759 | A | * | 4/1939 | Litsinger | F03B 11/066 184/103.2 |
| 2,169,296 | A | * | 8/1939 | Smith | F16N 7/36 184/6 |
| 3,118,623 | A | * | 1/1964 | Johnson | B02C 2/04 241/207 |
| 3,468,259 | A | * | 9/1969 | Morzynski | F04D 29/0416 277/358 |
| 4,270,064 | A | * | 5/1981 | Glandorf | H02K 9/20 184/104.1 |
| 4,460,284 | A | * | 7/1984 | Lauterbach | F01D 25/164 384/126 |
| 5,423,183 | A | * | 6/1995 | Folsom | F04C 14/20 60/413 |
| 6,575,269 | B1 | * | 6/2003 | Skoff | B60C 23/003 152/416 |
| 6,938,590 | B2 | * | 9/2005 | Buelna | F02B 75/26 123/43 A |
| 7,568,843 | B2 | * | 8/2009 | Lefebvre | F01D 25/162 184/6.11 |
| 2002/0076318 | A1 | * | 6/2002 | Patel | F01D 5/081 415/115 |
| 2003/0099538 | A1 | * | 5/2003 | Liu | F01D 25/183 415/1 |
| 2004/0035967 | A1 | * | 2/2004 | Johnson | B02C 2/00 241/207 |
| 2012/0011824 | A1 | * | 1/2012 | Cigal | F01D 9/065 60/39.08 |

FOREIGN PATENT DOCUMENTS

| | | | | | |
|---|---|---|---|---|---|
| GB | 1230049 | A | * | 4/1971 | ........... F16C 33/103 |
| JP | 49008638 | A | | 1/1974 | |
| JP | S498638 | A | | 1/1974 | |
| JP | 49100432 | A | | 9/1974 | |
| JP | 1981161778 | U | | 5/1983 | |
| JP | 198582498 | U | | 12/1986 | |
| JP | 1987063642 | U | | 11/1988 | |
| JP | 04036072 | A | * | 2/1992 | ........... F16C 37/002 |
| JP | H05106636 | A | | 4/1993 | |
| JP | H0874852 | A | | 3/1996 | |
| JP | 2903641 | B2 | * | 6/1999 | ........... F16C 37/002 |
| JP | 2003293977 | A | | 10/2003 | |
| JP | 2012057768 | A | | 3/2012 | |
| JP | 2014196788 | A | * | 10/2014 | .............. F16C 17/03 |

OTHER PUBLICATIONS

Chinese Office Action dated Feb. 20, 2019, for Chinese Patent Application No. 2016800480985.
Korean Office Action dated Apr. 2, 2019, for Korean Patent Application No. 10-2018-7007385.

* cited by examiner

VERTICAL BEARING DEVICE

CROSS-REFERENCE TO RELATED APPLICATIONS

This is a U.S. National Stage Patent Application from International Patent Application No. PCT/JP2016/065303, filed on May 24, 2016, and which is based on and claims priority to Japanese Patent Application No. 2015-162027, filed on Aug. 19, 2015, the entire contents of both of which are incorporated herein by reference.

FIELD OF THE INVENTION

The present invention relates to a vertical bearing device.

BACKGROUND OF THE INVENTION

A vertical bearing device that supports a rotating shaft member of a rotary machine such as a large generator and electric motor is publicly known. The vertical bearing device supports both of thrust load in the axial direction and radial load in the radial direction, of the rotating shaft member that extends vertically in the direction of gravitational force. Bearing parts corresponding to axial and radial load of the vertical bearing device become heated by rotation of the rotating shaft member, and therefore need to be appropriately cooled. Conventionally, a vertical bearing device has been adopting an air cooler that cools the whole device mainly by air-blowing, or an oil cooler that cools lubricating oil on the outside. When an air cooler is used, a fan that rotates with the rotating shaft member is used to cool the bearing device by an air flow generated by the fan (Japanese Patent Laid-Open No. 2003-293977). Instead, when an oil cooler is used, rotation of the rotating shaft member is used to discharge lubricating oil that lubricates the bearing part to the outside, and the lubricating oil is circulated between the bearing device and the cooler to thereby cool the bearing device (Japanese Patent Laid-Open No. 5-106636).

As described above, the vertical bearing device supports the rotating shaft member on each of a thrust bearing part in the axial direction and a journal bearing part in the radial direction. Hence, heat resulting from rotation of the rotating shaft member occurs in each of the thrust bearing part and the journal bearing part. The generated heat is absorbed by lubricating oil filling the inside of the vertical bearing device, and the lubricating oil having absorbed the heat is cooled by air or an external cooler.

Accordingly, if circulation of lubricating oil is hindered, the lubricating oil does not absorb the generated heat appropriately. This may cause a rise in temperature of the thrust bearing part or the journal bearing part. Increased temperature of the bearing parts causes a problem of seizing of the thrust bearing part or the journal bearing part. Meanwhile, a pump device or the like for circulating lubricating oil may be provided to prompt circulation of lubricating oil. However, this causes a problem of complication of maintenance due to complication of structure, and also deterioration in efficiency since driving power needs to be ensured.

SUMMARY OF THE INVENTION

Hence, an objective of the present invention is to provide a vertical bearing device that prompts circulation of lubricating oil without using a pump device, and suppresses seizing of a bearing part.

A vertical bearing device includes a circulation system part. The circulation system part has a circulation hole in an annular part of a thrust collar. The circulation hole penetrates the annular part from the inner peripheral side to the outer peripheral side in the radial direction of a rotating shaft member. The thrust collar rotates together with the rotating shaft member. The rotation of the thrust collar rotates the annular part accommodated in a circulation oil chamber. When the annular part rotates, centrifugal force and shear force, or differential pressure caused by difference in flow rate, for example, are generated in the lubricating oil in the circulation oil chamber. With this, the lubricating oil in the circulation oil chamber is guided from the inner peripheral side to the outer peripheral side of the annular part in the radial direction of the rotating shaft member, through the circulation hole penetrating the annular part. The flow of lubricating oil guided by the circulation hole forms a flow of lubricating oil from the lower oil chamber to the upper oil chamber through the circulation oil chamber. As a result, the lubricating oil stored in the lower oil chamber is circulated to the upper oil chamber through the circulation oil chamber, by rotation of the thrust collar. Accordingly, it is possible to prompt circulation of lubricating oil without using a pump device. Then, the thrust bearing part and journal bearing part are lubricated and cooled by the circulating flow of lubricating oil. Hence, seizing of the thrust bearing part and journal bearing part can be suppressed.

In a vertical bearing device, a casing forms, with an outer peripheral face of an annular part, an outer peripheral passage that allows passage of lubricating oil. The outer peripheral passage is configured such that the distance between the outer peripheral face and the casing is set larger above a virtual line than below the virtual line. The flow rate of the circulating lubricating oil increases toward an upper oil chamber. Hence, by increasing the distance between the casing and the outer peripheral face of the annular part above the virtual line, the lubricating oil having an increased flow rate does not accumulate and flows toward the upper oil chamber. Hence, it is possible to prompt circulation of lubricating oil, and suppress seizing of a thrust bearing part and journal bearing part.

In a vertical bearing device, a casing has, in a middle wall that separates a circulation oil chamber and an upper oil chamber, a connection hole that connects the circulation oil chamber and the upper oil chamber. The connection hole is formed into a tapered shape whose sectional area increases continuously toward the upper oil chamber from the circulation oil chamber side. Hence, the lubricating oil on the circulation oil chamber side is guided and moved to the upper oil chamber, by the connection hole whose sectional area increases toward the upper oil chamber. Accordingly, it is possible to prompt circulation of lubricating oil without increasing resistance, and to thereby suppress seizing of a thrust bearing part and journal bearing part.

A vertical bearing device includes a seal member. A casing forms, with an outer peripheral face of an annular part, an outer peripheral passage that allows passage of lubricating oil. The seal member restricts the flow of lubricating oil between the outer peripheral passage and a journal chamber. If lubricating oil flows from the journal chamber to the outer peripheral passage, lubrication of a journal bearing part accommodated in the journal chamber may become insufficient. On the other hand, if lubricating oil flows from the outer peripheral passage to the journal chamber, the lubricating oil heated from cooling a thrust bearing part may flow into the journal bearing part and raise the temperature of the journal bearing part. Hence, by providing the seal member, the flow of lubricating oil between the outer peripheral passage and the journal chamber can be blocked. It is therefore possible to prompt circulation of lubricating oil without hindering lubrication and cooling of the journal bearing part, and to suppress seizing.

DESCRIPTION OF EMBODIMENT(S) OF THE INVENTION

Hereinafter, vertical bearing devices of an embodiment will be described on the basis of the drawings.

Figure 1:
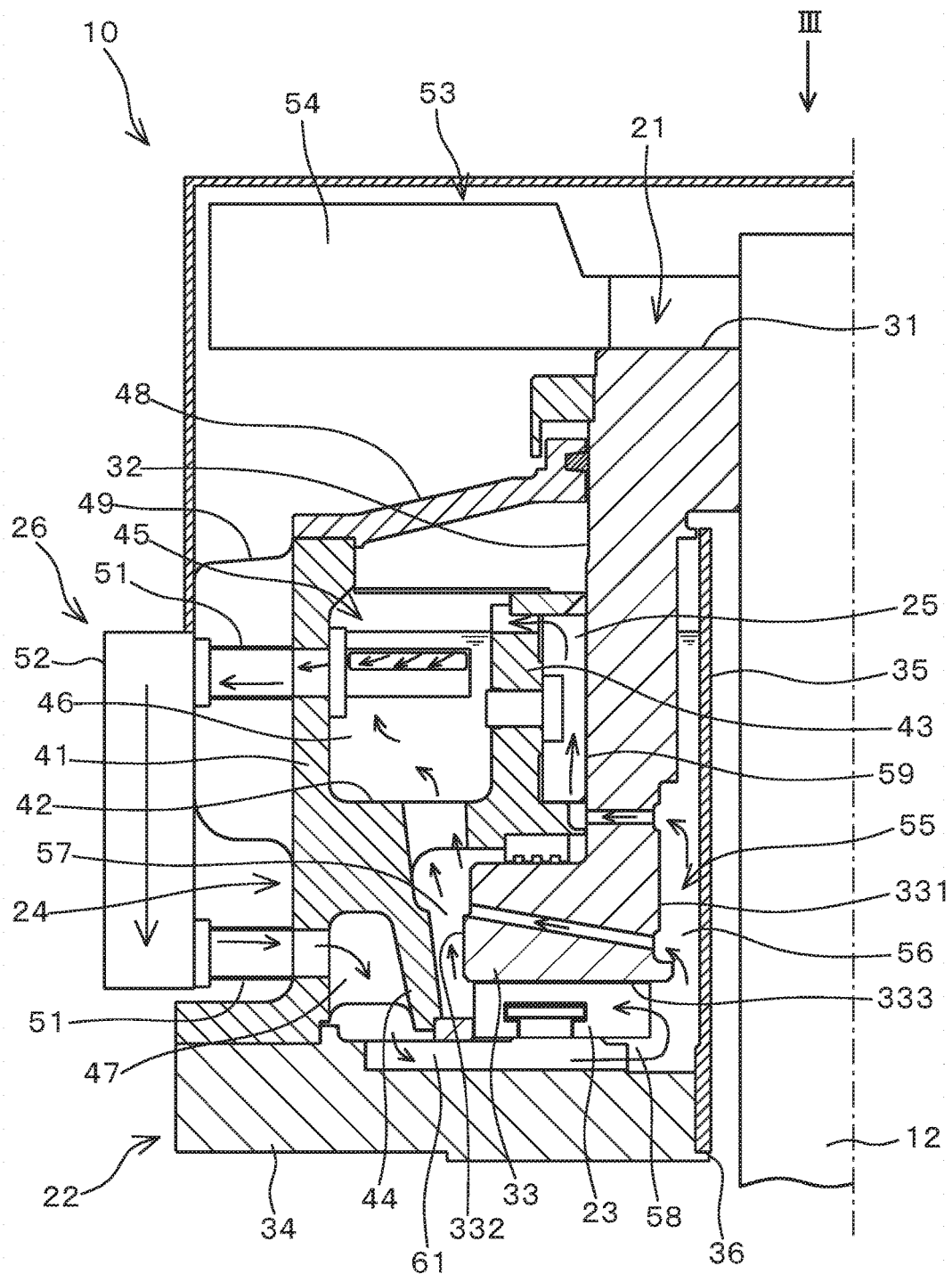
FIG. 1 is a schematic diagram of a section of a vertical bearing device of an embodiment.
Figure 2:
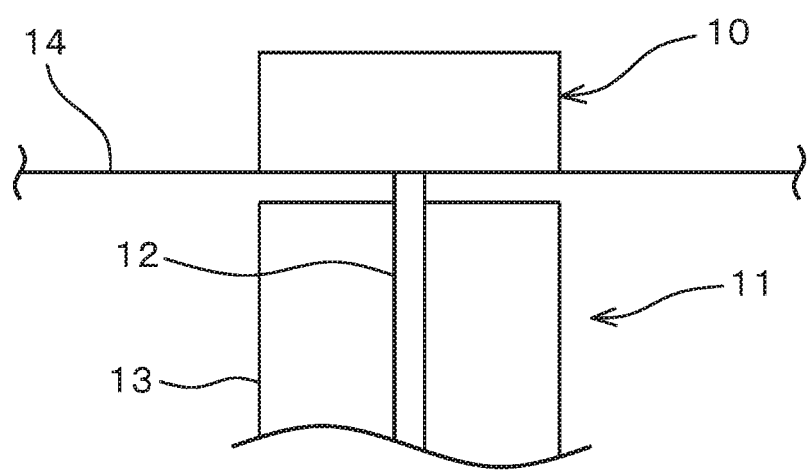
FIG. 2 is a diagram of a rotary machine to which the vertical bearing device of an embodiment is applied.
Figure 3:
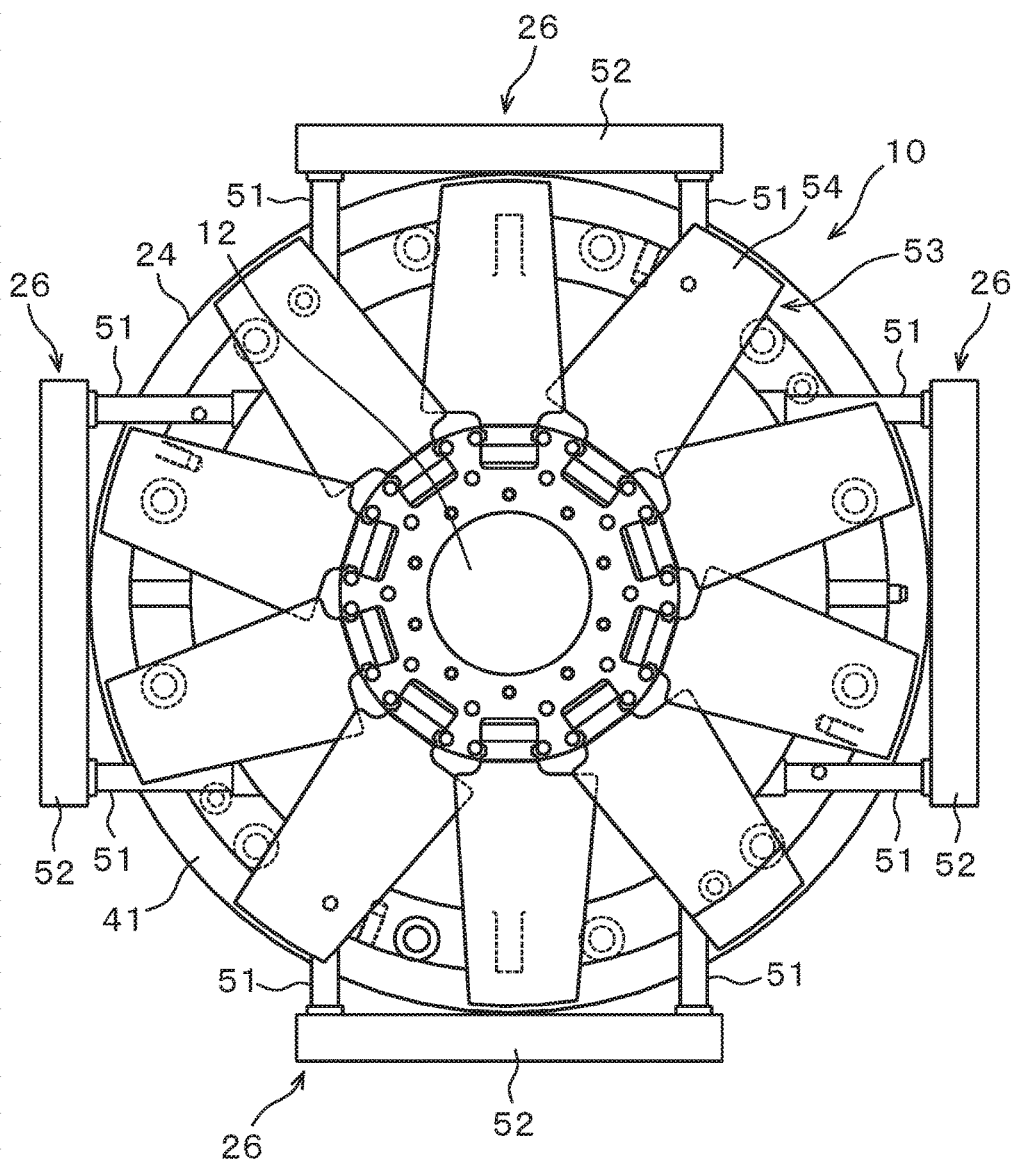
FIG. 3 is an arrow view as seen from an arrow III direction of FIG. 1.

A vertical bearing device 10 illustrated in FIGS. 1, 2, and 3 is used as a bearing of a rotary machine 11 illustrated in FIG. 2. The rotary machine 11 includes a rotor 13 that rotates around a rotating shaft member 12, such as a generator, pump, motor, and a turbine. The rotary machine 11 is not limited to these examples, and may be applied to any device that rotates around a rotating shaft member 12. The rotary machine 11 includes the rotating shaft member 12 at the center of rotation. The rotating shaft member 12 extends vertically in the direction of gravitational force. The vertical bearing device 10 supports the rotating shaft member 12 of the rotary machine 11 at the upper end of the rotary machine 11, that is, on the upper side in the direction of gravitational force. The vertical bearing device 10 is fixed on a floor 14 of a facility, and suspends and supports the rotary machine 11. Note that the rotating shaft member 12 may penetrate the vertical bearing device 10 in the upper direction, and a drive source that drives the rotating shaft member 12 may be provided above the vertical bearing device 10.

As illustrated in FIG. 1, the vertical bearing device 10 includes a thrust collar 21, a base plate 22, a thrust bearing portion 23, a casing 24, a journal bearing portion 25, and a cooling portion 26. The thrust collar 21 is formed into a cylinder, and is provided integrally with the rotating shaft member 12. Accordingly, the thrust collar 21 rotates integrally with the rotating shaft member 12. The thrust collar 21 has an upper face portion 31, a cylinder portion 32, and an annular portion 33. The upper face portion 31, cylinder portion 32, and annular portion 33 are formed as one body. The upper face portion 31 is positioned at the upper end of the thrust collar 21, and the rotating shaft member 12 penetrates the center of the upper face portion 31. The cylinder portion 32 extends downward from the upper face portion 31, and is provided on the axially outer side of the rotating shaft member 12 as a cylinder that is concentric with the rotating shaft member 12. The annular portion 33 is provided at the lower end of the cylinder portion 32, that is, on an end part opposite to the upper face portion 31. The annular portion 33 has a larger outer diameter than the cylinder portion 32, and its end part on the outer peripheral side protrudes farther to the radially outer side than the cylinder portion 32. The annular portion 33 has, in the radial direction of the rotating shaft member 12, an inner peripheral face 331 on the inner peripheral side and an outer peripheral face 332 on the outer peripheral side. The rotating shaft member 12 is assembled integrally with the thrust collar 21 by penetrating the upper face portion 31 of the thrust collar 21. The rotating shaft member 12 is fixed to the thrust collar 21 by press-fitting or welding, for example.

The base plate 22 has a main body 34 and an oil cylinder portion 35. The main body 34 and the oil cylinder portion 35 of the base plate 22 are formed as individual members, or are formed as one body by a single member. In the embodiment, the oil cylinder portion 35 is formed separately from the main body 34, and is attached to the main body 34. The main body 34 is formed into a circular plate having an opening 36 at the center thereof. The rotating shaft member 12 penetrates the center opening 36. The oil cylinder portion 35 is provided as a cylinder formed along the edge of the opening 36 of the main body 34, and extends upward from the main body 34. Hence, the oil cylinder portion 35 cylindrically surrounds the radially outer side of the rotating shaft member 12. The base plate 22 is fixed to the floor 14 of the facility, or is fixed to an unillustrated housing or the like of the rotary machine 11.

The thrust bearing portion 23 is provided in a part where the thrust collar 21 and the base plate 22 face each other. Specifically, the thrust bearing portion 23 is provided in a part where the thrust collar 21 and the base plate 22 face each other in the axial direction of the rotating shaft member 12. In the embodiment, the thrust bearing portion 23 is provided in the main body 34 of the base plate 22, in a position where it faces the annular portion 33 of the thrust collar 21. The thrust bearing portion 23 slides on the annular portion 33 of the thrust collar 21 that rotates together with the rotating shaft member 12. To be specific, the thrust bearing portion 23 slides on a sliding surface 333 on the main body 34 side of the annular portion 33. Thus, the thrust bearing portion 23 axially supports the rotation of the rotating shaft member 12.

The casing 24 surrounds the outer peripheral side of the rotating shaft member 12. The casing 24 has a casing main body 41, a middle wall 42, an inner wall 43, and a lower wall 44. The casing 24 is connected to the base plate 22 on the lower end thereof. The casing 24 forms, together with the base plate 22, a container having an open upper end. The container-like space formed of the casing 24 and the base plate 22 is an oil chamber 45 that stores lubricating oil. In other words, the casing 24 is integrated with the base plate 22 to form a container, and forms the oil chamber 45. The lubricating oil is filled in the oil chamber 45.

The casing main body 41 is formed into an annular shape, and constitutes an outer wall of the casing 24. The lower end of the casing main body 41 is in contact with the base plate 22. The middle wall 42 is provided in the middle of the casing main body 41 in the axial direction, and protrudes radially inward from the casing main body 41. That is, the middle wall 42 protrudes to the rotating shaft member 12 side in an annual shape, from an inner wall of the casing main body 41. The inner wall 43 extends upward from the vicinity of a radially inner end part of the middle wall 42. The inner wall 43 is provided in a cylindrical shape in the vicinity of the radially inner end part of the middle wall 42. The lower wall 44 extends downward from the middle of the middle wall 42 in the radial direction. As in the case of the inner wall 43, the lower wall 44 is provided in a cylindrical shape below the middle wall 42.

Thus, the middle wall 42 of the casing 24 partitions the oil chamber 45 formed with the base plate 22 into an upper oil chamber 46 and a lower oil chamber 47. The upper oil chamber 46 is formed into an annular shape between the casing main body 41 and the inner wall 43, on the upper side of the middle wall 42. Meanwhile, the lower oil chamber 47 is formed into an annular or cylindrical shape between the casing main body 41 and the lower wall 44, on the lower side of the middle wall 42. As described above, the casing 24 uses the middle wall 42 to partition the oil chamber 45 into the upper oil chamber 46 on the upper side and the lower oil chamber 47 on the lower side in the direction of gravitational force. The casing 24 has a top plate 48. The top plate 48 covers the upper end side of the container-shaped oil chamber 45.

The journal bearing portion 25 is provided in a part where the thrust collar 21 and the casing 24 face each other. Specifically, the journal bearing portion 25 is provided in a part where the thrust collar 21 and the casing 24 face each other in the radial direction of the rotating shaft member 12. In the embodiment, the journal bearing portion 25 is provided on the inner wall 43 of the casing 24, in a position where it faces the cylinder portion 32 of the thrust collar 21. The journal bearing portion 25 slides on the cylinder portion 32 of the thrust collar 21 that rotates together with the rotating shaft member 12. To be specific, the journal bearing portion 25 slides on an outer peripheral face of the cylinder portion 32. Thus, the journal bearing portion 25 radially supports the rotation of the rotating shaft member 12.

The cooling portion 26 has a lubricating oil passage portion 51 and a radiating portion 52. The lubricating oil passage portion 51 is configured of a pipe-like member that allows passage of lubricating oil, and has a lubricating oil groove formed therein. The lubricating oil passage portion 51 has one end connected to the upper oil chamber 46, and the other end connected to the lower oil chamber 47. Specifically, the lubricating oil passage portion 51 has an upper end part connected to the upper oil chamber 46, and a lower end part connected to the lower oil chamber 47. The lubricating oil passage portion 51 is directly attached to the casing main body 41. In other words, the lubricating oil passage portion 51 is formed integrally with the casing main body 41. Moreover, the lubricating oil passage portion 51 protrudes radially outward from the casing main body 41. That is, the lubricating oil passage portion 51 is exposed to the outside from the casing main body 41. The radiating portion 52 is provided in the lubricating oil passage portion 51 exposed from the casing main body 41. The radiating portion 52 has unillustrated radiator fins and other parts to ensure surface area for heat exchange. As illustrated in FIG. 3, multiple cooling portions 26 are provided in the circumferential direction of the vertical bearing device 10. In the embodiment, the vertical bearing device 10 includes four cooling portions 26 equally spaced apart in the circumferential direction. The number and arrangement of the cooling portions 26 are not limited to the example illustrated in FIG. 3, and may be set arbitrarily.

Lubricating oil stored in the upper oil chamber 46 illustrated in FIG. 1 flows to the lower oil chamber 47 on the lower side through the lubricating oil passage portion 51, due to gravity and a pumping effect caused by circulation of the lubricating oil. At this time, lubricating oil passes through the lubricating oil passage portion 51 exposed from the casing main body 41. Hence, lubrication oil loses heat in the radiating portion 52 disposed in the way of lubricating oil passage portion 51. That is, lubricating oil loses heat in the radiating portion 52 while flowing from the upper oil chamber 46 to the lower oil chamber 47 through the lubricating oil passage portion 51, and is cooled. As has been described, the cooling portion 26 cools lubricating oil flowing from the upper oil chamber 46 to the lower oil chamber 47.

In addition to the above, the vertical bearing device 10 also includes an air blowing portion 53. The air blowing portion 53 has a fan portion 54 that rotates together with the rotating shaft member 12. Rotation of the fan portion 54 together with the rotating shaft member 12 forms an up-to-down air flow on the outer side of the casing 24. The air flow moves along the top plate 48 and the casing main body 41 of the casing 24, and passes the radiating portion 52 of the cooling portion 26. Thus, the air flow formed by rotation of the fan portion 54 cools the casing 24 and the cooling portion 26. Consequently, heat loss from lubricating oil stored in the oil chamber 45 and lubricating oil passing through the cooling portion 26 is prompted. The casing 24 may have fins 49 in a position where the air flow is formed by rotation of the fan portion 54.

The casing 24 partitions the oil chamber 45 not only into the upper oil chamber 46 and the lower oil chamber 47, but also into a circulation oil chamber 55. The circulation oil chamber 55 is formed in a part of the oil chamber 45 except for the upper oil chamber 46 and the lower oil chamber 47. The circulation oil chamber 55 accommodates a part of the cylinder portion 32 and the annular portion 33 of the thrust collar 21. Additionally, the thrust bearing portion 23 and the journal bearing portion 25 are provided in the circulation oil chamber 55. That is, the thrust bearing portion 23 that slides on the annular portion 33 of the thrust collar 21 is positioned on the lower side of the circulation oil chamber 55. Meanwhile, the journal bearing portion 25 that slides on the cylinder portion 32 of the thrust collar 21 is positioned on the upper side of the circulation oil chamber 55.

The circulation oil chamber 55 includes an inner peripheral passage 56, an outer peripheral passage 57, a thrust chamber 58, and a journal chamber 59. The inner peripheral passage 56 is formed between the inner peripheral face 331 of the annular portion 33 and the oil cylinder portion 35 of the base plate 22. The outer peripheral passage 57 is formed between the outer peripheral face 332 of the annular portion 33 and the middle wall 42 and lower wall 44 of the casing 24. The inner peripheral passage 56 and the outer peripheral passage 57 are formed into an annular shape continuous in the circumferential direction of the rotating shaft member 12. The thrust chamber 58 is formed between the lower end of the annular portion 33 and the base plate 22. The thrust chamber 58 accommodates the thrust bearing portion 23. The journal chamber 59 is formed between the cylinder portion 32 of the thrust collar 21 and the inner wall 43 of the casing 24. The journal chamber 59 accommodates the journal bearing portion 25.

The lubricating oil having moved from the upper oil chamber 46 to the lower oil chamber 47 through the cooling portion 26 flows into the circulation oil chamber 55, through a lower oil groove 61 formed in the base plate 22. The lower oil groove 61 is formed as a radially extending groove or an annular recess on the upper side, that is, on the casing 24 side, of the base plate 22. Lubricating oil in the lower oil chamber 47 passes through the lower oil groove 61 to move to the inner peripheral passage 56 of the circulation oil chamber 55.

The lubricating oil having flowed into the circulation oil chamber 55 is returned to the upper oil chamber 46, by use of rotation of the thrust collar 21 inside the circulation oil chamber 55. Thus, the lubricating oil stored in the upper oil chamber 46 is circulated through the cooling portion 26, lower oil chamber 47, lower oil groove 61, and circulation oil chamber 55. Details of the system for circulating lubricating oil will be described later. Heat generated by sliding of the thrust bearing portion 23 and the journal bearing portion 25 is absorbed by the circulating lubricating oil. Then, the absorbed heat is passed through the cooling portion 26 by circulation of the lubricating oil, and is thereby dissipated in the cooling portion 26. As a result, the lubricating oil is cooled, and cooling of the thrust bearing portion 23 and journal bearing portion 25 where frictional heat is generated is prompted.

Next, the system for circulating lubricating oil from the circulation oil chamber 55 to the upper oil chamber 46 will be described in detail.

Figure 4:
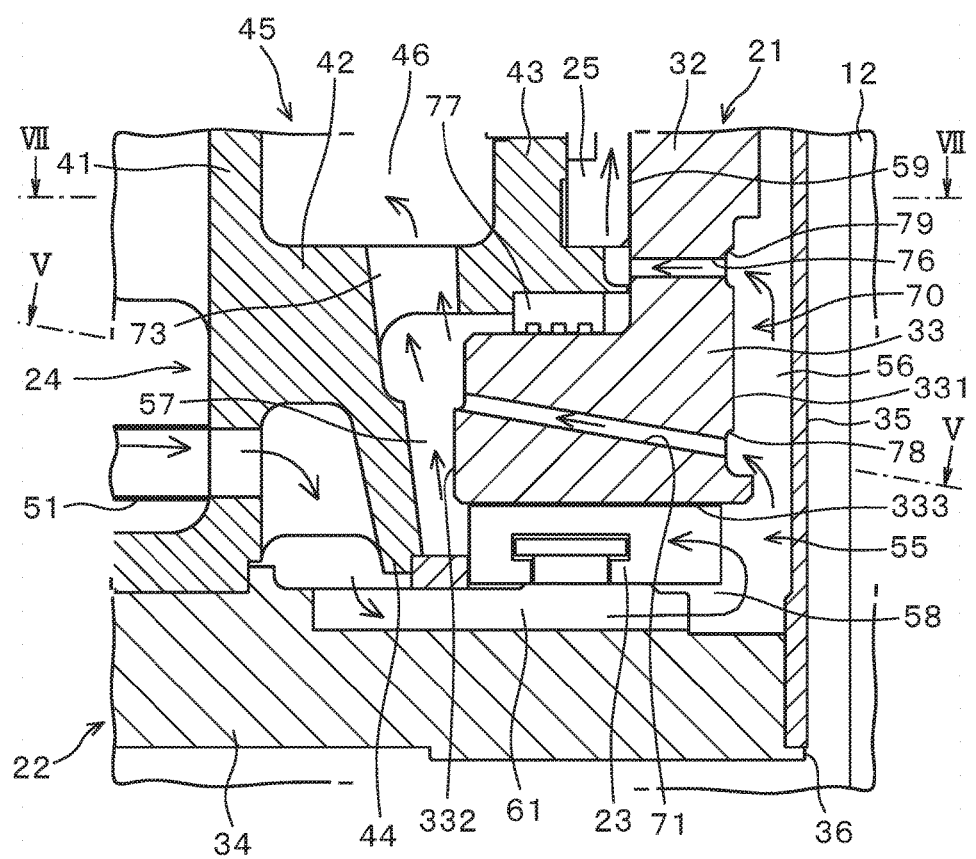
FIG. 4 is an enlarged view enlarging the vicinity of an annular part of the vertical bearing device of FIG. 1.
Figure 5:
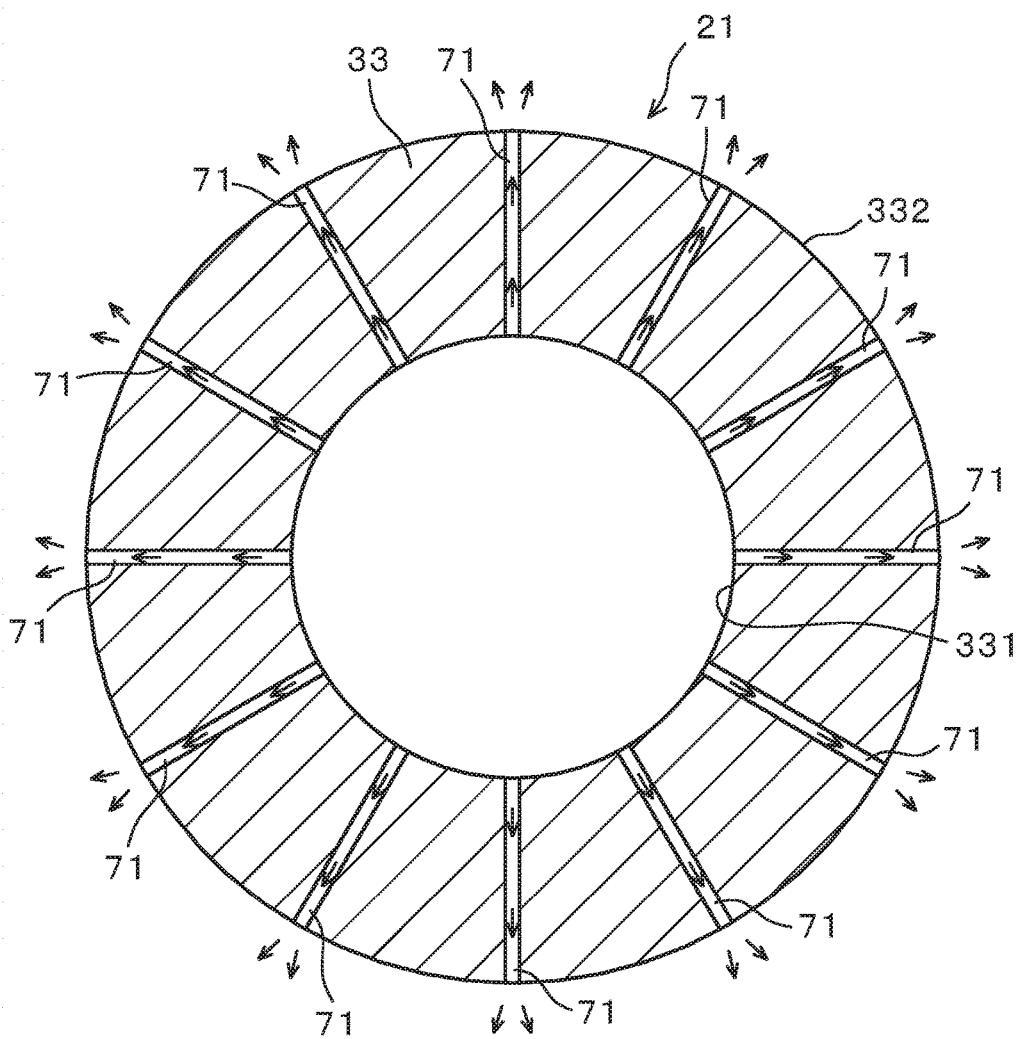
FIG. 5 is a cross-sectional view of the annular part illustrated in FIG. 4, cut along line V-V of FIG. 4.

As illustrated in FIG. 4, the vertical bearing device 10 includes a circulation system part 70. The circulation system part 70 has a circulation hole 71. The circulation hole 71 is provided in the annular portion 33 of the thrust collar 21, and penetrates the annular portion 33 from inner to outer sides in the radial direction. As illustrated in FIG. 5, the circulation hole 71 is extended in the circumferential direction of the annular portion 33. In the embodiment, the annular portion 33 has 12 circulation holes 71 extending radially in the circumferential direction. One end of the circulation hole 71 opens on the outer peripheral face 332 of the annular portion 33, and the other end opens on the inner peripheral face 331 of the annular portion 33. Additionally, as illustrated in FIG. 4, the circulation hole 71 is tilted upward from the inner peripheral face 331 toward the outer peripheral face 332 in the radial direction of the rotating shaft member 12. In other words, of the circulation hole 71, the end on the outer peripheral face 332 side is positioned higher than the end on the inner peripheral face 331 side in the axial direction of the rotating shaft member 12. Note that the circulation hole 71 may be tilted with respect to the radial direction of the annular portion 33. Each of or each group of the circulation hole 71 may have the same or different widths and/or orientations. Note, however, that in the context of manufacturing, it is preferable that the circulation holes 71 all have the same width and orientation. As described above, the width and orientation of the circulation holes 71 can be set arbitrarily to control movement of lubricating oil, depending on the required performance of the vertical bearing device 10.

Since the circulation holes 71 are provided in the annular portion 33, when the thrust collar 21 rotates together with the rotating shaft member 12, lubricating oil on the inner peripheral side of the annular portion 33 in the circulation oil chamber 55 is guided to the outer peripheral side of the annular portion 33 by the circulation holes 71. That is, since the thrust collar 21 rotates relative to the fixed base plate 22, the lubricating oil on the inner peripheral side of the annular portion 33 flows toward the upper oil chamber 46 through the circulation holes 71. Thus, a flow of lubricating oil from the circulation oil chamber 55 toward the upper oil chamber 46 is formed. At this time, the upward inclination of the circulation holes 71 allows the lubricating oil to be guided more smoothly toward the upper oil chamber 46 on the upper side. Since the lubricating oil in the circulation oil chamber 55 flows into the upper oil chamber 46 through the circulation holes 71, the lubricating oil in the lower oil chamber 47 is supplied to the circulation oil chamber 55 through the lower oil groove 61. The lower oil groove 61 connects the lower oil chamber 47 and the inner peripheral passage 56 of the circulation oil chamber 55. That is, the lubricating oil stored in the lower oil chamber 47 is supplied to the inner peripheral passage 56 from the lower oil chamber 47, through the lower oil groove 61.

Figure 6:
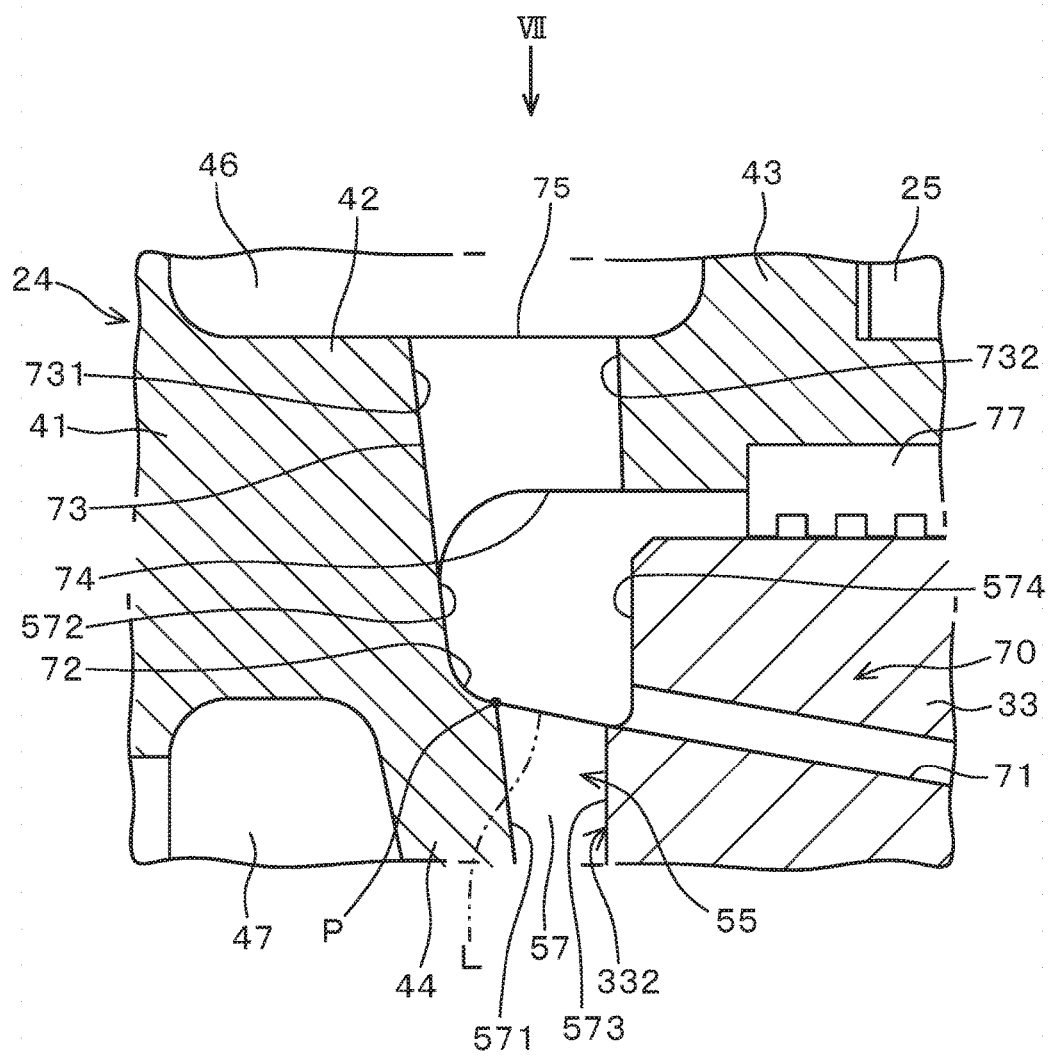
FIG. 6 is an enlarged view enlarging the vicinity of a connection hole of the vertical bearing device illustrated in FIG. 4.

As described above, the outer peripheral passage 57 is formed between the outer peripheral face 332 of the annular portion 33 of the thrust collar 21 and the middle wall 42 and lower wall 44 of the casing 24. The distance between the outer peripheral face 332 and the casing 24 in the outer peripheral passage 57, is preferably set larger on the upper part than in the lower part in the axial direction of the rotating shaft member 12. To give a specific description, the lower end of the circulation hole 71 provided in the annular portion 33 is extended to set a virtual line L. As illustrated in FIG. 6, when the lower end of the circulation hole 71 is extended, the virtual line L intersects with the casing 24. With this, the outer peripheral passage 57 is formed by being surrounded with faces 571 and 572 which are inner walls of the casing 24, and faces 573 and 574 which constitute the outer peripheral face 332 of the annular portion 33. In the outer peripheral passage 57, the distance between the faces 572 and 574 facing each other above the virtual line L is set larger than the distance between the faces 571 and 573 facing each other below the virtual line L. To be more specific, the outer peripheral passage 57 surrounded by the middle wall 42 and lower wall 44 of the casing 24 and the annular portion 33 bulges toward the outer peripheral side, above an intersection point P where the outer peripheral passage 57 intersects with the virtual line L. Thus, in the outer peripheral passage 57, the distance between opposing faces increases above the virtual line L. In addition, the casing 24 may have a curved face portion 72 on a wall face extending upward from the intersection point P. In other words, an end part on the inner peripheral side of the middle wall 42 and lower wall 44 of the casing 24 may have the curved face portion 72 curving upward from the intersection point P. Note that the outer peripheral passage 57 may be formed such that the distance between the casing 24 and the outer peripheral face 332 increases continuously from lower to upper sides, in a section including the center axis of the rotating shaft member 12.

Figure 7:
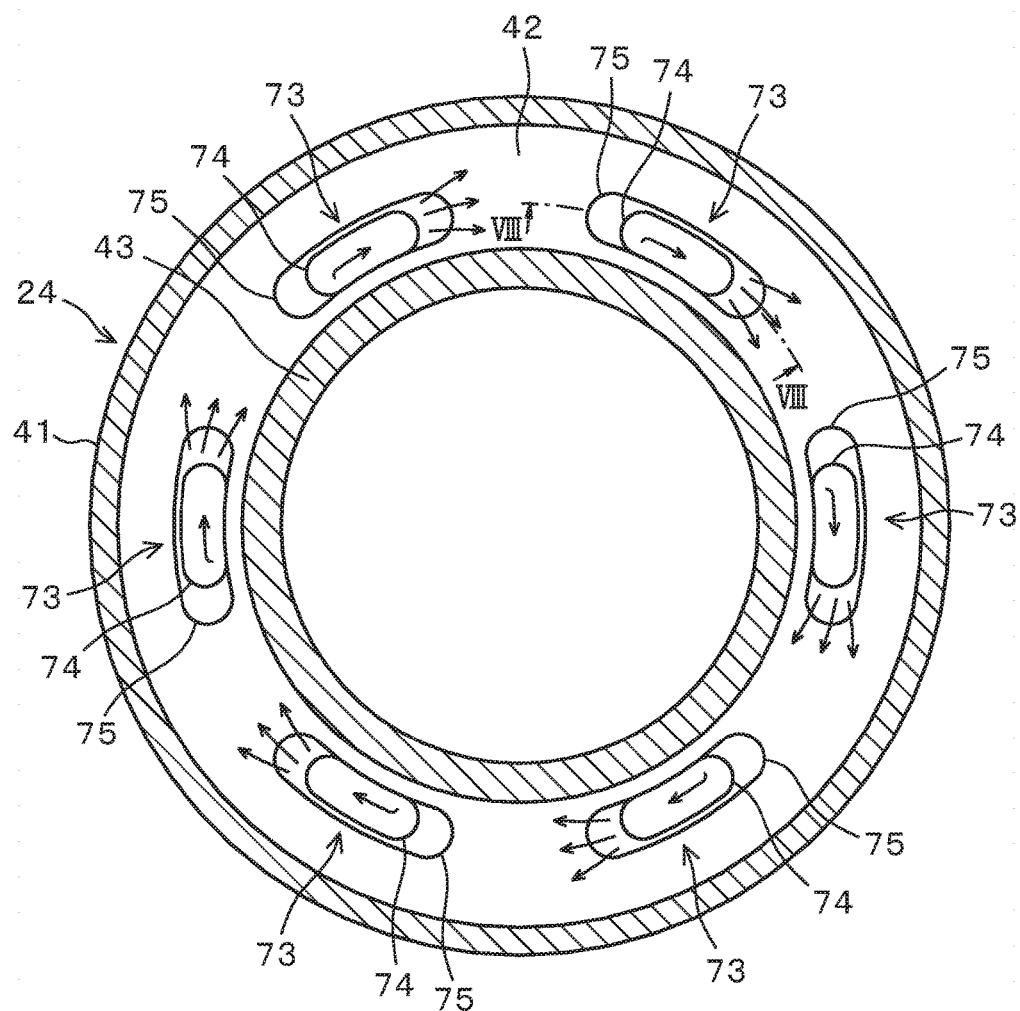
FIG. 7 is a cross-sectional view of a casing of the vertical bearing device of an embodiment, cut along line VII-VII of FIG. 4.
Figure 8:
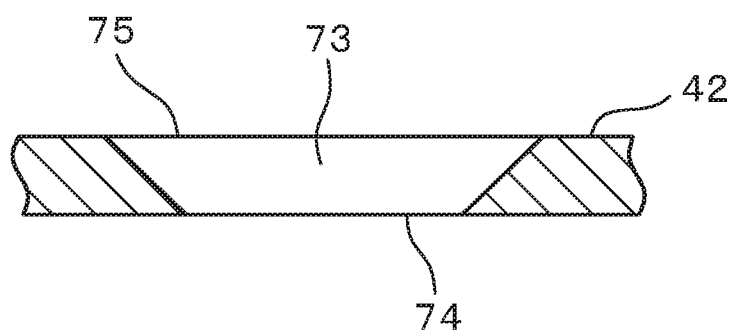
FIG. 8 is a cross-sectional view of the vicinity of the connection hole of FIG. 7, cut along line VIII-VIII of FIG. 7.

The casing 24 has a connection hole 73 in the middle wall 42 that separates the circulation oil chamber 55 and the upper oil chamber 46. In other words, the connection hole 73 connects the circulation oil chamber 55 and the upper oil chamber 46 by penetrating the middle wall 42. The connection hole 73 has a radially outer face 731 and a radially inner face 732. The connection hole 73 has a lower opening 74 and an upper opening 75. The lower opening 74 is a lower end of the connection hole 73, and opens to the outer peripheral passage 57 of the circulation oil chamber 55. The upper opening 75 is an upper end of the connection hole 73, and opens to the upper oil chamber 46. As illustrated in FIGS. 7 and 8, in the connection hole 73, it is preferable that the opening area of the lower opening 74 be smaller than the opening area of the upper opening 75. It is also preferable that the connection hole 73 be formed into a tapered shape where the sectional area increases continuously from the lower opening 74 toward the upper opening 75.

Multiple connection holes 73 are provided in the circumferential direction of the casing 24. In the embodiment, the casing 24 has six connection holes 73 in the circumferential direction. The number of connection holes 73 may be set arbitrarily. As illustrated in FIGS. 6 and 7, for example, in the middle wall 42 in which the connection hole 73 is formed, it is preferable that the face 732 on the inner peripheral side in the radial direction of the rotating shaft member 12 extend parallel to the axis of the rotating shaft member 12. That is, in the embodiment, the connection hole 73 is formed such that the inner peripheral face 732 is parallel to the center axis of the rotating shaft member 12. Meanwhile, in the middle wall 42 in which the connection hole 73 is formed, the outer peripheral face 731 in the radial direction of the rotating shaft member 12 is tilted relative to the center axis of the rotating shaft member 12. That is, in the connection hole 73, the outer peripheral face 731 is tilted in such a manner as to draw away from the rotating shaft member 12 toward the upper side. Hence, the connection hole 73 is formed into a tapered shape where the sectional area increases continuously from the circulation oil chamber 55 side, toward the upper oil chamber 46.

Figure 9:
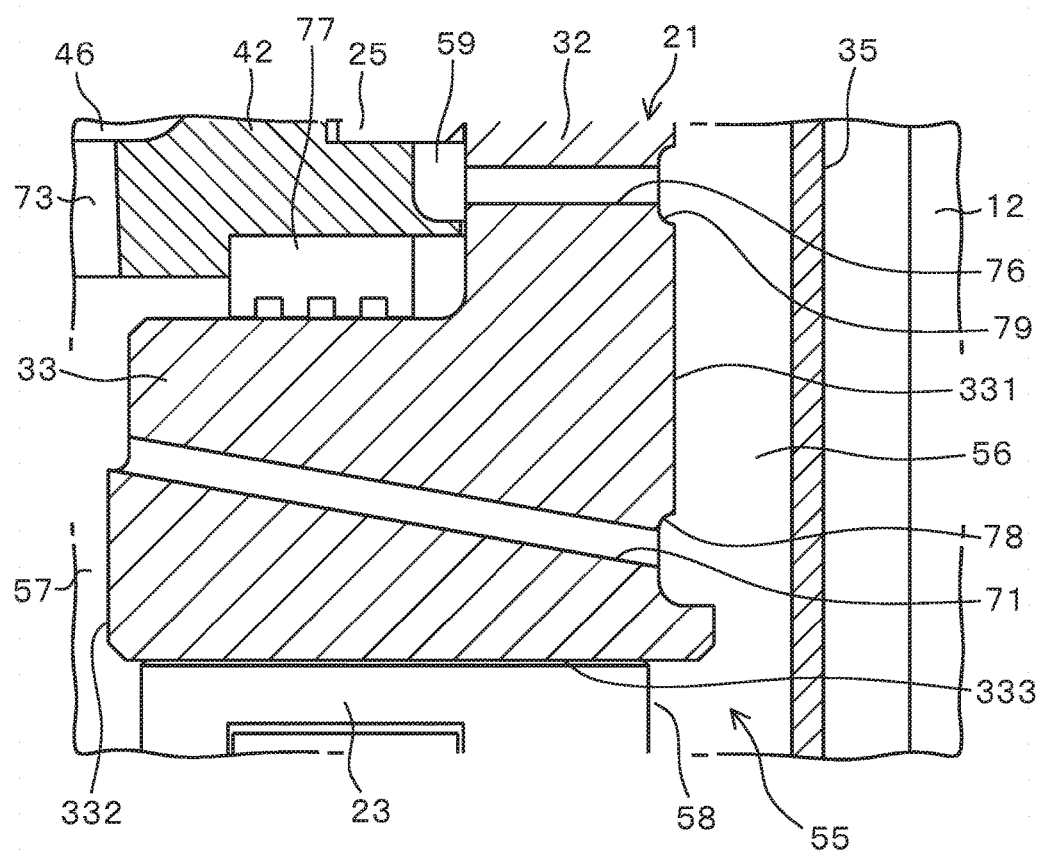
FIG. 9 is an enlarged view further enlarging the vicinity of the annular part of the vertical bearing device illustrated in FIG. 4.

As illustrated in FIGS. 4 and 9, the vertical bearing device 10 includes a journal through hole 76. The journal through hole 76 penetrates the cylinder portion 32 of the thrust collar 21 in the radial direction. The journal through hole 76 connects the inner peripheral passage 56 of the circulation oil chamber 55 and the journal chamber 59, by penetrating the cylinder portion 32. Hence, lubricating oil in the inner peripheral passage 56 of the circulation oil chamber 55 flows into the journal chamber 59 through the journal through hole 76. The lubricating oil having flowed into the journal chamber 59 is circulated into the upper oil chamber 46 from the journal chamber 59, by rotation of the thrust collar 21. At this time, the lubricating oil having flowed into the journal chamber 59 lubricates the journal bearing portion 25, and flows into the upper oil chamber 46. The journal through hole 76 may or may not be tilted from the inner peripheral side to the outer peripheral side, in radial and axial directions of the rotating shaft member 12. Additionally, each of or each group of the journal through hole 76 may have the same or different widths and/or orientations. Note, however, that in the context of manufacturing, it is preferable that the journal through holes 76 all have the same width and orientation. As described above, the width and orientation of the journal through holes 76 can be set arbitrarily to control movement of lubricating oil, depending on the required performance of the vertical bearing device 10.

The vertical bearing device 10 includes a seal member 77. The seal member 77 is provided in a position where the upper end of the annular portion 33 of the thrust collar 21 and the lower end of the middle wall 42 of the casing 24 face each other. As mentioned earlier, the circulation oil chamber 55 includes the thrust chamber 58 that accommodates the thrust bearing portion 23, and the journal chamber 59 that accommodates the journal bearing portion 25. The lubricating oil supplied to the circulation oil chamber 55 from the lower oil chamber 47 through the lower oil groove 61, is circulated to the upper oil chamber 46 through the following three circulation paths in the circulation oil chamber 55.

Path 1: circulation path starting from the inner peripheral passage 56, lubricating the thrust bearing portion 23 of the thrust chamber 58, and flowing toward the upper oil chamber 46 through the outer peripheral passage 57 and the connection hole 73

Path 2: circulation path starting from the inner peripheral passage 56, and flowing toward the upper oil chamber 46 through the circulation hole 71 of the annular portion 33, the outer peripheral passage 57, and the connection hole 73

Path 3: circulation path starting from the inner peripheral passage 56, lubricating the journal bearing portion 25 of the journal chamber 59 after passing through the journal through hole 76, and flowing toward the upper oil chamber 46

As described above, lubricating oil in the circulation oil chamber 55 flows into the upper oil chamber 46 through three paths. At this time, the lubricating oil having flowed into the journal chamber 59 through Path 3 may pass through between the upper end of the annular portion 33 and the lower end of the middle wall 42 and form a flow into the outer peripheral passage 57, instead of lubricating the journal bearing portion 25 accommodated in the journal chamber 59. For this reason, the seal member 77 is provided between the upper end of the annular portion 33 and the lower end of the middle wall 42. Thus, the flow of lubricating oil in Path 3 from the journal through hole 76 directed toward the outer peripheral passage 57 is restricted by the seal member 77. Conversely, the seal member 77 also restricts the lubricating oil flowing through the outer peripheral passage 57 after passing through Path 1 or 2 from flowing into the journal chamber 59. Lubricating oil having passed through Path 1 and cooled the thrust bearing portion 23 of the thrust chamber 58 also flows through the outer peripheral passage 57. The lubricating oil having passed through Path 1 is heated after cooling the thrust bearing portion 23. If the heated lubricating oil flows into the journal chamber 59, it may hinder cooling of the journal bearing portion 25 accommodated in the journal chamber 59 by lubricating oil. Hence, the seal member 77 is provided to restrict the flow of lubricating oil from the outer peripheral passage 57 into the journal chamber 59 as well.

The upper end of the annular portion 33 and the lower end of the middle wall 42 are also parts where the fixed casing 24 and the rotating thrust collar 21 face each other in the axial direction of the rotating shaft member 12. Accordingly, the seal member 77 may be a secondary thrust bearing portion that supports the thrust collar 21 in the axial direction, together with the thrust bearing portion 23. That is, the seal member 77 supports the rotating shaft member 12 in the axial direction, together with the thrust bearing portion 23.

As illustrated in FIGS. 4 and 9, the thrust collar 21 may have introduction portions 78 and 79. The introduction portion 78 is provided in the inner peripheral face 331 of the annular portion 33 of the thrust collar 21. Meanwhile, the introduction portion 79 is provided on an inner peripheral face of the cylinder portion 32 of the thrust collar 21. Ends of the circulation hole 71 and the journal through hole 76 open on the inner peripheral face of the thrust collar 21. The introduction portion 78 is provided at the inner peripheral opening of the circulation hole 71. Similarly, the introduction portion 79 is provided at the inner peripheral opening of the journal through hole 76. The introduction portion 78 is recessed radially outward from the inner peripheral face 331. In addition, the introduction portion 78 is formed such that its inner diameter gradually decreases from the inner peripheral face 331 toward the opening of the circulation hole 71. Similarly, the introduction portion 79 is recessed radially outward from the inner peripheral face of the cylinder portion 32. The introduction portion 79, too, is formed such that its inner diameter gradually decreases from the inner peripheral face of the cylinder portion 32 toward the opening of the journal through hole 76. The introduction portions 78 and 79 are provided in the circulation hole 71 and the journal through hole 76 that open on the inner peripheral face of the thrust collar 21, respectively. Note that the introduction portions 78 and 79 may be formed into a circumferentially continuous groove on the inner peripheral face of the thrust collar 21. In this case, each of the introduction portions 78 and 79 is formed such that its inner diameter in the axial direction of the rotating shaft member 12 gradually decreases toward the opening of the circulation hole 71 or the journal through hole 76. The groove-like part as the introduction portions 78 and 79 may be formed into an annular shape continuous in the circumferential direction of the thrust collar 21, or may be discontinuous in the circumferential direction. Moreover, the circumferential depth and axial width of the groove-like parts serving as the introduction portions 78 and 79 may be changed arbitrarily in different positions. The introduction portion 78 guides lubricating oil in the inner peripheral passage 56 into the circulation hole 71. Similarly, the introduction portion 79 guides lubricating oil in the inner peripheral passage 56 into the journal through hole 76. This prompts the lubricating oil in the inner peripheral passage 56 to flow into the circulation hole 71 and the journal through hole 76. Note that the embodiment illustrates an example in which both of the introduction portions 78 and 79 are formed. However, the configuration may include one or both of the introduction portions 78 and 79.

A description will be given of circulation of lubricating oil and cooling of the thrust bearing portion 23 and the journal bearing portion 25 by lubricating oil, according to the vertical bearing device 10 configured in the above manner.

The thrust collar 21 rotates together with the rotating shaft member 12. Accordingly, the thrust collar 21 rotates inside the fixed base plate 22 and casing 24. Lubricating oil stored in the circulation oil chamber 55 forms a flow directed from inner to outer sides of the rotating shaft member 12, that is, from the inner peripheral passage 56 to the outer peripheral passage 57, due to centrifugal force and shear force caused by rotation of the thrust collar 21, or differential pressure caused by difference in flow rate, for example. This flow causes the lubricating oil in the inner peripheral passage 56 to circulate to the upper oil chamber 46 through the thrust chamber 58 as in the aforementioned Path 1, through the circulation hole 71 as in the aforementioned Path 2, and through the journal chamber 59 as in the aforementioned Path 3.

The circulation hole 71 constituting Path 2 penetrates the annular portion 33 of the thrust collar 21, and therefore lubricating oil receives relatively low resistance through the path. Meanwhile, the thrust chamber 58 constituting Path 1 accommodates the thrust bearing portion 23. Hence, the flow rate of lubricating oil passing through the circulation hole 71 becomes higher than the flow rate of lubricating oil passing through the thrust chamber 58. The lubricating oil having passed the circulation hole 71 and having a high flow rate flows out to the outer peripheral passage 57, and its flow direction is smoothly directed upward along the curved face portion 72 formed in the casing 24. Thus, lubricating oil having flowed into the outer peripheral passage 57 from the circulation hole 71 changes its flow direction upward along the curved face portion 72, and flows into the connection hole 73. At this time, the flow rate of lubricating oil from the circulation hole 71 toward the connection hole 73 is higher than the flow rate of lubricating oil from the thrust chamber 58 to the outer peripheral passage 57. The difference in flow rate between lubricating oil flowing through different paths causes the lubricating oil flowing from the thrust chamber 58 to the outer peripheral passage 57 to be absorbed into lubricating oil directed from the circulation hole 71 toward the connection hole 73. As a result, the lubricating oil passing through the thrust chamber 58 of Path 1 having a high resistance is drawn up into the upper oil chamber 46 through the connection hole 73, by the flow of lubricating oil passing through the circulation hole 71 of Path 2. Hence, the lubricating oil having cooled the thrust bearing portion 23 in the thrust chamber 58 does not accumulate in the thrust chamber 58 and the outer peripheral passage 57, but is circulated to the upper oil chamber 46.

Additionally, rotation of the thrust collar 21 circulates a part of lubricating oil in the inner peripheral passage 56 to the upper oil chamber 46, through the journal through hole 76 and the journal chamber 59 constituting Path 3. In this case, too, the lubricating oil in the inner peripheral passage 56 flows into the journal chamber 59 through the journal through hole 76, due to centrifugal force and shear force caused by rotation of the thrust collar 21, or differential pressure caused by difference in flow rate, for example. The lubricating oil having flowed into the journal chamber 59 is caused to flow into the upper oil chamber 46 from the journal chamber 59, after lubricating oil is continuously supplied to the journal chamber 59 by rotation of the thrust collar 21. Hence, the lubricating oil having cooled the journal bearing portion 25 in the journal chamber 59 does not accumulate in the journal chamber 59, but is circulated to the upper oil chamber 46.

The lubricating oil having returned to the upper oil chamber 46 by circulation flows down to the lower oil chamber 47, due to gravity and a pumping effect caused by circulation of the lubricating oil. At this time, since the upper oil chamber 46 is connected to the cooling portion 26, lubricating oil in the upper oil chamber 46 flows into the lower oil chamber 47 through the cooling portion 26. Although the upper oil chamber 46 is connected to the outer peripheral passage 57 of the circulation oil chamber 55 through the connection hole 73, lubricating oil passing through Paths 1 and 2 flow into the upper oil chamber 46 through the connection hole 73, as described earlier. Hence, it is assumed that no flow of lubricating oil from the upper oil chamber 46 toward the circulation oil chamber 55 through the connection hole 73 will occur.

The lubricating oil having flowed into the cooling portion 26 loses heat by passing through the radiating portion 52. Specifically, the lubricating oil having absorbed the heat generated from sliding of the thrust bearing portion 23 and the journal bearing portion 25 loses heat by passing through the cooling portion 26. The cooled lubricating oil flows into the lower oil chamber 47. When the thrust collar 21 rotates, lubricating oil in the circulation oil chamber 55 flows out toward the upper oil chamber 46, as mentioned earlier. Hence, when the lubricating oil in the circulation oil chamber 55 decreases, the lubricating oil having flowed into the lower oil chamber 47 is supplied to the inner peripheral passage 56 of the circulation oil chamber 55 through the lower oil groove 61.

As has been described, the thrust collar 21 rotating together with the rotating shaft member 12 forms a flow of lubricating oil passing through the circulation oil chamber 55 and a flow of lubricating oil passing through the cooling portion 26, between the upper oil chamber 46 and the lower oil chamber 47. In other words, a flow of lubricating oil circulating between the upper oil chamber 46 and the lower oil chamber 47 is formed. As a result, the lubricating oil repeats cooling of the thrust bearing portion 23 and journal bearing portion 25, and the heat dissipation in the cooling portion 26. This enables lubrication and cooling of the thrust bearing portion 23 and journal bearing portion 25 of the vertical bearing device 10, and heat dissipation of lubricating oil having absorbed heat from the cooling.

In the aforementioned embodiment, the lubricating oil passage portion 51 constituting the cooling portion 26 is exposed to the outside. Hence, the lubricating oil flowing through the lubricating oil passage portion 51 loses heat in the radiating portion 52 in the lubricating oil passage portion 51 exposed to the outside of the casing 24. Thus, the lubricating oil having absorbed heat of the thrust bearing portion 23 and the journal bearing portion 25 is cooled in the cooling portion 26 while moving from the upper oil chamber 46 to the lower oil chamber 47. As a result, the circulating lubricating oil prompts cooling of the heated thrust bearing portion 23 and journal bearing portion 25. Additionally, the lubricating oil passage portion 51 of the cooling portion 26 is provided integrally with the casing 24, on the radially outer side of the casing 24. For this reason, the cooling portion 26 does not require long piping. Hence, cooling capacity can be enhanced without complicating structure and maintenance.

Moreover, the embodiment includes the air blowing portion 53. The air blowing portion 53 forms a flow of air toward the cooling portion 26, by the fan portion 54 that rotates together with the rotating shaft member 12. Accordingly, cooling of the cooling portion 26 is prompted by the flow of air formed by the fan portion 54. Hence, it is possible to prompt heat dissipation of lubricating oil circulating through the cooling portion 26, and to prompt cooling of the thrust bearing portion 23 and journal bearing portion 25 by lubricating oil.

In the embodiment, the thrust bearing portion 23 and the journal bearing portion 25 are provided in the circulation oil chamber 55, through which the lubricating oil circulating from the lower oil chamber 47 to the upper oil chamber 46 flows. Hence, the thrust bearing portion 23 and the journal bearing portion 25 that generate heat from supporting rotation of the rotating shaft member 12 are cooled by the lubricating oil flowing through the circulation oil chamber 55. Accordingly, it is possible to prompt cooling of the thrust bearing portion 23 and journal bearing portion 25, and suppress seizing. Hence, an anti-seize property of the vertical bearing device 10 can be improved.

Additionally, the embodiment includes the circulation system part 70. In the circulation system part 70, multiple circulation holes 71 are formed in the annular portion 33 of the thrust collar 21. When the annular portion 33 of the thrust collar 21 rotates together with the rotating shaft member 12, centrifugal force and shear force, or differential pressure caused by difference in flow rate, for example, are generated in the lubricating oil in the circulation oil chamber 55. With this, the lubricating oil in the circulation oil chamber 55 is guided from inner to outer sides of the annular portion 33, through the circulation holes 71 penetrating the annular portion 33. The flow of lubricating oil guided by the circulation holes 71 forms a flow of lubricating oil directed toward the upper oil chamber 46, from the lower oil chamber 47 through the circulation oil chamber 55. As a result, the lubricating oil stored in the lower oil chamber 47 is circulated to the upper oil chamber 46 through the circulation oil chamber 55, by rotation of the thrust collar 21. Accordingly, it is possible to prompt circulation of lubricating oil without using a pump device or the like. Then, the thrust bearing portion 23 and journal bearing portion 25 are lubricated and cooled by the circulating flow of lubricating oil. Hence, seizing of the thrust bearing portion 23 and journal bearing portion 25 can be suppressed.

In the embodiment, the circulation hole 71 is tilted upward from inner to outer sides. Hence, the flow of lubricating oil passing through the circulation hole 71 is directed upward, that is, toward the upper oil chamber 46, when the lubricating oil flows out of the circulation hole 71. This allows the lubricating oil having passed the circulation hole 71 to be easily guided to the upper oil chamber 46. Accordingly, it is possible to prompt the flow of lubricating oil having passed the circulation hole 71, and to thereby prompt circulation of the lubricating oil. Additionally, the circulation hole 71 penetrates the annular portion 33 of the thrust collar 21. The thrust bearing portion 23 is provided on the lower end of the annular portion 33. Since lubricating oil flows through the circulation hole 71, the thrust bearing portion 23 is cooled by the lubricating oil flowing through the circulation hole 71. Hence, it is also possible to prompt cooling of the thrust bearing portion 23 and thrust collar 21.

In the embodiment, in the outer peripheral passage 57, the distance between the faces 572 and 574 above the virtual line L is set larger than the distance between the faces 571 and 573 below the virtual line L. The flow rate of lubricating oil passing through the circulation hole 71 is higher than the flow rate of lubricating oil passing through the thrust bearing portion 23. Hence, the flow of lubricating oil passing through the circulation hole 71 and flowing toward the upper oil chamber 46 draws up the lubricating oil passing through the thrust bearing portion 23. As a result, on the upper side of the virtual line L, lubricating oil having passed through the thrust bearing portion 23 flows together with lubricating oil having passed through the circulation hole 71. For this reason, the distance is increased on the upper side of the virtual line L, so that the lubricating oil having an increased flow rate does not accumulate and flows toward the upper oil chamber 46. Hence, it is possible to prompt circulation of lubricating oil.

In the embodiment, the casing 24 has the curved face portion 72 on a wall face provided higher than the intersection point P with the virtual line L. Lubricating oil having flowed out of the circulation hole 71 is guided smoothly by the curved face portion 72, to the upper oil chamber 46 on the upper side. Accordingly, resistance in the circulation path of lubricating oil is reduced, and circulation of the lubricating oil can be prompted.

In the embodiment, the connection hole 73 provided in the middle wall 42 of the casing 24 connects the circulation oil chamber 55 and the upper oil chamber 46. The connection hole 73 is formed into a tapered shape whose sectional area increases continuously toward the upper oil chamber 46, from the outer peripheral passage 57 side of the circulation oil chamber 55. Hence, the lubricating oil on the circulation oil chamber 55 side is guided by the connection hole 73 having the increasing sectional area, and is moved to the upper oil chamber 46. Accordingly, it is possible to prompt circulation of lubricating oil without increasing resistance.

In the embodiment, the inner peripheral face 732 of the connection hole 73 is parallel to the center axis of the rotating shaft member 12. Accordingly, a flow directed toward the upper oil chamber 46 on the upper side is formed in the lubricating oil passing through the connection hole 73, and therefore the flow is less likely to be disturbed. Hence, it is possible to suppress increase in resistance due to flow disturbance, and to prompt circulation of lubricating oil.

The embodiment includes the seal member 77. The seal member 77 restricts the flow of lubricating oil between the outer peripheral passage 57 and the journal chamber 59. If lubricating oil flows from the journal chamber 59 to the outer peripheral passage 57, lubrication of the journal bearing portion 25 accommodated in the journal chamber 59 may become insufficient. On the other hand, if lubricating oil flows from the outer peripheral passage 57 to the journal chamber 59, the lubricating oil heated from cooling the thrust bearing portion 23 may flow into the journal bearing portion 25 and raise the temperature of the journal bearing portion 25. Hence, by providing the seal member 77, the flow of lubricating oil between the outer peripheral passage 57 and the journal chamber 59 can be blocked. It is therefore possible to prompt circulation of lubricating oil without hindering lubrication and cooling of the journal bearing portion 25.

In the embodiment, the seal member 77 may serve as a secondary thrust bearing portion. In this configuration, the rotating shaft member 12 is supported by the seal member 77 serving as the thrust bearing portion 23 and the secondary thrust bearing portion. Hence, it is possible to more stably support the rotating shaft member 12 and prompt circulation of lubricating oil, without increasing the number of parts.

The embodiment includes the introduction portion 78 to the inlet of the circulation hole 71, and the introduction portion 79 to the inlet of the journal through hole 76. The introduction portions 78 and 79 are set such that their inner diameter decrease toward the circulation hole 71 and the journal through hole 76. With this, the introduction portions 78 and 79 guide lubricating oil in the inner peripheral passage 56 to the circulation hole 71 and the journal through hole 76. In other words, the lubricating oil in the inner peripheral passage 56 is guided by these introduction portions 78 and 79 to be introduced into the circulation hole 71 and journal through hole 76. This prompts the flow of lubricating oil from the inner peripheral passage 56 to the circulation hole 71 and the journal through hole 76. Hence, it is possible to prompt circulation of lubrication oil.

The present invention described above is not limited to the above embodiments, and is applicable to various embodiments without departing from the gist of the invention.

Figure 10:
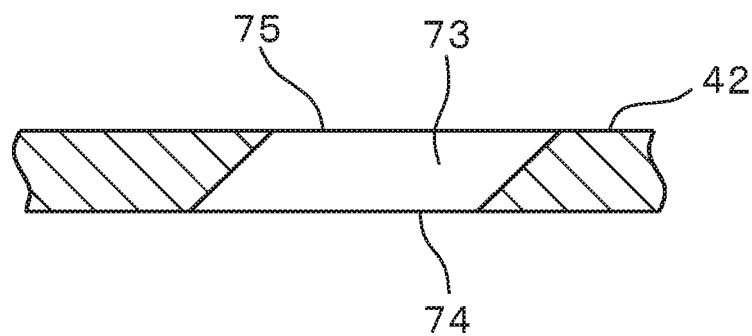
FIG. 10 is a cross-sectional view of the vicinity of a connection hole of the other embodiments, cut along a position corresponding to line VIII-VIII of FIG. 7.
Figure 11:
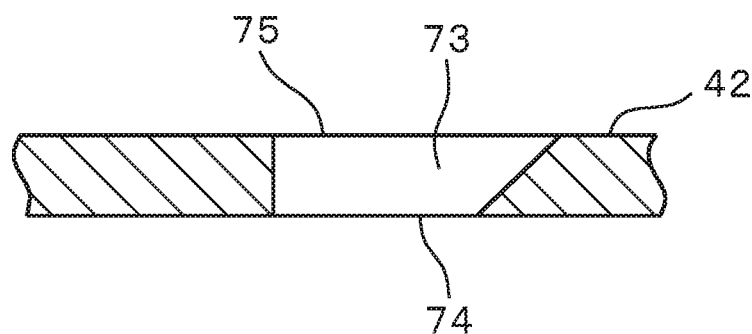
FIG. 11 is a cross-sectional view of the vicinity of the connection hole of the other embodiments, cut along the position corresponding to line VIII-VIII of FIG. 7.

In the aforementioned embodiment, in the connection hole 73, tilted faces tilt in opposite directions relative to the circumferential direction of the casing 24, so as to be symmetric to each other, as illustrated in FIGS. 7 and 8. However, the connection hole 73 may be configured such that the tilted faces tilt in the same direction relative to the circumferential direction, as illustrated in FIG. 10. If the rotating shaft member 12 is configured to rotate both in the normal and reverse directions, it is preferable that the connection hole 73 be formed into the shape illustrated in FIGS. 7 and 8. Additionally, the front and rear inclinations of the connection hole 73 in the circumferential direction of the casing 24 may be the same as illustrated in FIGS. 8 and 10, or may be different as illustrated in FIG. 11. In both cases, the shape of the connection hole 73 can be set arbitrarily to control movement of lubricating oil, depending on the required performance of the vertical bearing device 10.

The invention claimed is:
1. A vertical bearing device comprising:
 a cylindrical thrust collar that rotates together with a rotating shaft member extending in the direction of gravitational force;
 an annular part that is provided in an annular shape on the lower end of the thrust collar;
 a base plate that faces the annular part;
 a thrust bearing part that is provided in a part where the annular part and the base plate face each other in an axial direction of the rotating shaft member, and supports the rotating shaft member in the axial direction;
 a casing that surrounds the outer peripheral side of the rotating shaft member, is formed into a container shape integrally forming, with the base plate, an oil chamber for storing lubricating oil, and partitions the oil chamber into an upper oil chamber provided on the upper side in the direction of gravitational force, a lower oil chamber provided on the lower side in the direction of gravitational force, and a circulation oil chamber provided in a path of the lubricating oil from the lower oil chamber to the upper oil chamber and accommodating the annular part;
 a journal bearing part that is provided in a part where the casing and the thrust collar face each other in a radial direction of the rotating shaft member, and supports the rotating shaft member in the radial direction; and
 a circulation system part that has a circulation hole penetrating the annular part from the inner peripheral side to the outer peripheral side of the annual part in the radial direction of the rotating shaft member, guides the lubricating oil in the circulation oil chamber from the inner peripheral side to the outer peripheral side of the annular part by rotation of the thrust collar rotating together with the rotating shaft member, and forms a flow of the lubricating oil from the lower oil chamber to the upper oil chamber;
 wherein the casing forms, with an outer peripheral face of the annular part, an outer peripheral passage that allows passage of the lubricating oil; and
 wherein a distance between the outer peripheral face and the casing that face each other and form the outer peripheral passage, is set larger above a border which is a virtual line obtained by extending the lower end of the circulation hole to the outer peripheral side toward the casing, than below the virtual line.

2. The vertical bearing device according to claim 1, wherein
 the circulation hole is tilted upward from the inner peripheral side to the outer peripheral side in the radial direction of the rotating shaft member.

3. The vertical bearing device according to claim 1, wherein
 the casing has, on a side opposite to an end part of the circulation hole on the outer peripheral side, a curved face part in a wall face extending upward from a point where the casing intersects with the virtual line.

4. The vertical bearing device according to claim 1, wherein:
 the casing has, in a middle wall that separates the circulation oil chamber and the upper oil chamber, a connection hole that forms the outer peripheral passage, and connects the circulation oil chamber and the upper oil chamber; and
 the connection hole is formed into a tapered shape whose sectional area increases continuously toward the upper oil chamber from the circulation oil chamber side.

5. The vertical bearing device according to claim 4, wherein the connection hole is formed such that the inner peripheral side in the radial direction of the rotating shaft member is parallel to the axial direction of the rotating shaft member.

6. The vertical bearing device according to claim 1, wherein:
the circulation oil chamber has a thrust chamber that accommodates the thrust bearing part, and a journal chamber that accommodates the journal bearing part; and
the vertical bearing device further comprises a seal member that restricts the flow of the lubricating oil between the outer peripheral passage and the journal chamber, passing through between the thrust collar and the casing.

7. The vertical bearing device according to claim 6, wherein
the seal member is provided between an upper end face of the annular part and a lower end face of the casing, and serves as a secondary thrust bearing part that supports the rotating shaft member in the axial direction together with the thrust bearing part.

8. The vertical bearing device according to claim 6, further comprising:
a journal through hole that penetrates the thrust collar in the radial direction of the rotating shaft member, from the inner peripheral side to the journal chamber; and
an introduction part formed on an inner peripheral wall part of the thrust collar, configured such that the inner diameter decreases toward at least any one of the circulation hole and the journal through hole, and introduces the lubricating oil on the inner peripheral side of the thrust collar to the circulation hole and the journal through hole.

9. The vertical bearing device according to claim 1, further comprising a cooling part that has a lubricating oil passage part provided integrally with the casing on the radially outer side of the casing, and exposed from the casing to allow passage of the lubricating oil moving from the upper oil chamber to the lower oil chamber, and cools the lubricating oil moving from the upper oil chamber to the lower oil chamber through the lubricating oil passage part by a flow of air on the outer peripheral side of the casing.

10. A rotary machine comprising:
the vertical bearing device according to claim 1; and
a rotor that has at least one end in the axial direction of the rotating shaft member supported by the vertical bearing device.

11. A vertical bearing device comprising:
a cylindrical thrust collar that rotates together with a rotating shaft member extending in the direction of gravitational force;
an annular part that is provided in an annular shape on the lower end of the thrust collar;
a base plate that faces the annular part;
a thrust bearing part that is provided in a part where the annular part and the base plate face each other in an axial direction of the rotating shaft member, and supports the rotating shaft member in the axial direction;
a casing that surrounds the outer peripheral side of the rotating shaft member, is formed into a container shape integrally forming, with the base plate, an oil chamber for storing lubricating oil, and partitions the oil chamber into an upper oil chamber provided on the upper side in the direction of gravitational force, a lower oil chamber provided on the lower side in the direction of gravitational force, and a circulation oil chamber provided in a path of the lubricating oil from the lower oil chamber to the upper oil chamber and accommodating the annular part; and
a journal bearing part that is provided in a part where the casing and the thrust collar face each other in a radial direction of the rotating shaft member, and supports the rotating shaft member in the radial direction, wherein:
the casing forms, with an outer peripheral face of the annular part, an outer peripheral passage that allows passage of the lubricating oil; and
a distance between the outer peripheral face and the casing that face each other and form the outer peripheral passage, is set larger above a border which is a virtual line obtained by extending the lower end of the circulation hole to the outer peripheral side toward the casing, than below the virtual line.

12. The vertical bearing device according to claim 11, wherein
the casing has, on a side opposite to an end part of the circulation hole on the outer peripheral side, a curved face part in a wall face extending upward from a point where the casing intersects with the virtual line.

13. The vertical bearing device according to claim 11, further comprising a cooling part that has a lubricating oil passage part provided integrally with the casing on the radially outer side of the casing, and exposed from the casing to allow passage of the lubricating oil moving from the upper oil chamber to the lower oil chamber, and cools the lubricating oil moving from the upper oil chamber to the lower oil chamber through the lubricating oil passage part by a flow of air on the outer peripheral side of the casing.

14. A rotary machine comprising:
the vertical bearing device according to claim 11; and
a rotor that has at least one end in the axial direction of the rotating shaft member supported by the vertical bearing device.

15. A vertical bearing device comprising:
a cylindrical thrust collar that rotates together with a rotating shaft member extending in the direction of gravitational force;
an annular part that is provided in an annular shape on the lower end of the thrust collar;
a base plate that faces the annular part;
a thrust bearing part that is provided in a part where the annular part and the base plate face each other in an axial direction of the rotating shaft member, and supports the rotating shaft member in the axial direction;
a casing that surrounds the outer peripheral side of the rotating shaft member, is formed into a container shape integrally forming, with the base plate, an oil chamber for storing lubricating oil, and partitions the oil chamber into an upper oil chamber provided on the upper side in the direction of gravitational force, a lower oil chamber provided on the lower side in the direction of gravitational force, and a circulation oil chamber provided in a path of the lubricating oil from the lower oil chamber to the upper oil chamber and accommodating the annular part; and
a journal bearing part that is provided in a part where the casing and the thrust collar face each other in a radial direction of the rotating shaft member, and supports the rotating shaft member in the radial direction, wherein:
the casing has, in a middle wall that separates the circulation oil chamber and the upper oil chamber, a connection hole that forms the outer peripheral passage, and connects the circulation oil chamber and the upper oil chamber; and the connection hole is formed into a tapered shape whose sectional area increases continuously toward the upper oil chamber from the circulation oil chamber side.

16. The vertical bearing device according to claim 15, wherein
the connection hole is formed such that the inner peripheral side in the radial direction of the rotating shaft member is parallel to the axial direction of the rotating shaft member.

17. A vertical bearing device comprising:
a cylindrical thrust collar that rotates together with a rotating shaft member extending in the direction of gravitational force;
an annular part that is provided in an annular shape on the lower end of the thrust collar;
a base plate that faces the annular part;
a thrust bearing part that is provided in a part where the annular part and the base plate face each other in an axial direction of the rotating shaft member, and supports the rotating shaft member in the axial direction;
a casing that surrounds the outer peripheral side of the rotating shaft member, is formed into a container shape integrally forming, with the base plate, an oil chamber for storing lubricating oil, and partitions the oil chamber into an upper oil chamber provided on the upper side in the direction of gravitational force, a lower oil chamber provided on the lower side in the direction of gravitational force, and a circulation oil chamber provided in a path of the lubricating oil from the lower oil chamber to the upper oil chamber and accommodating the annular part; and
a journal bearing part that is provided in a part where the casing and the thrust collar face each other in a radial direction of the rotating shaft member, and supports the rotating shaft member in the radial direction, wherein:
the circulation oil chamber has a thrust chamber that accommodates the thrust bearing part, and a journal chamber that accommodates the journal bearing part;
the casing forms, with an outer peripheral face of the annular part, an outer peripheral passage that allows passage of the lubricating oil; and
the vertical bearing device further comprises a seal member that restricts the flow of the lubricating oil between the outer peripheral passage and the journal chamber.

18. The vertical bearing device according to claim 17, wherein the seal member is provided between an upper end face of the annular part and a lower end face of the casing, and serves as a secondary thrust bearing part that supports the rotating shaft member in the axial direction together with the thrust bearing part.

19. The vertical bearing device according to claim 17, further comprising a cooling part that has a lubricating oil passage part provided integrally with the casing on the radially outer side of the casing, and exposed from the casing to allow passage of the lubricating oil moving from the upper oil chamber to the lower oil chamber, and cools the lubricating oil moving from the upper oil chamber to the lower oil chamber through the lubricating oil passage part by a flow of air on the outer peripheral side of the casing.

20. A rotary machine comprising:
the vertical bearing device according to claim 17; and
a rotor that has at least one end in the axial direction of the rotating shaft member supported by the vertical bearing device.

21. The vertical bearing device according to claim 15, further comprising a cooling part that has a lubricating oil passage part provided integrally with the casing on the radially outer side of the casing, and exposed from the casing to allow passage of the lubricating oil moving from the upper oil chamber to the lower oil chamber, and cools the lubricating oil moving from the upper oil chamber to the lower oil chamber through the lubricating oil passage part by a flow of air on the outer peripheral side of the casing.

22. A rotary machine comprising:
the vertical bearing device according to claim 15; and
a rotor that has at least one end in the axial direction of the rotating shaft member supported by the vertical bearing device.

* * * * *